United States Patent [19]

Pâris et al.

[11] 4,111,686

[45] * Sep. 5, 1978

[54] PRODUCTION OF METALS AND METAL ALLOYS OF HIGH PURITY

[76] Inventors: Reńe Antoine Pâris, 152, Cours Gambetta, Lyon 7°, Rhône; Paul Alexis Amblard, 3, rue Julien Baudran, Bron, Rhône; Abel Claude Rousset, 37 bis, rue Jean Moulin, Caluire, Rhône, all of France

[ * ] Notice: The portion of the term of this patent subsequent to Sep. 30, 1992, has been disclaimed.

[21] Appl. No.: 617,846

[22] Filed: Sep. 29, 1975

Related U.S. Application Data

[63] Continuation of Ser. No. 250,080, May 3, 1972, Pat. No. 3,909,247.

[30] Foreign Application Priority Data

May 6, 1971 [FR] France ............................... 71.17059
Nov. 3, 1971 [FR] France ............................... 71.40191

[51] Int. Cl.$^2$ ....................... C22C 1/04; C22C 43/00; B22F 9/00
[52] U.S. Cl. .............. 75/0.5 A; 75/0.5 AB; 75/106; 75/135; 75/84; 75/84.1 R
[58] Field of Search .............. 423/364, 377, 367, 644, 423/645; 75/0.5 A, 0.5 AA, 0.5 AB, 84.1 R, 105, 106, 118, 119, 121, 135, 84; 252/301 R

[56] References Cited

U.S. PATENT DOCUMENTS

| | | | |
|---|---|---|---|
| 1,397,684 | 11/1921 | Hahn | 75/106 |
| 3,007,793 | 11/1961 | Grimes | 75/119 |
| 3,347,662 | 10/1967 | Snyder | 75/106 |
| 3,904,737 | 9/1975 | Paris et al. | 423/367 |
| 3,909,247 | 9/1975 | Paris et al. | 75/84.1 R |

FOREIGN PATENT DOCUMENTS 14,129  9/1901  Sweden ................................. 423/377

*Primary Examiner*—O. R. Vertiz
*Assistant Examiner*—Brian E. Hearn
*Attorney, Agent, or Firm*—Karl F. Ross

[57] ABSTRACT

A method of making powdered metals or metal alloys of high purity wherein a monometallic or polymetallic cyanide complex is formed of a metal of Groups IIIA, IVA and IIIB of the *Periodic Table of the Elements* (especially or including, yttrium, the lanthanides elements of atomic numbers 58 – 71, inclusive, titanium, zirconium, hafnium, chromium, gallium, indium, thorium, cobalt and nickel). The cyanide complex is treated in crystalline form with dry hydrogen at temperatures generally between 700° and 1300° C, any hydride formed being decomposed by heating.

10 Claims, No Drawings

PRODUCTION OF METALS AND METAL ALLOYS OF HIGH PURITY

This is a continuation of application Ser. No. 250,080, filed May 3, 1972, now U.S. Pat. No. 3,909,247.

CROSS-REFERENCE TO RELATED APPLICATION

This application relates to the commonly owned application Ser. No. 250,079 entitled NEW METAL CYANIDE COMPLEXES AND METHOD OF MAKING SAME, now U.S. Pat. No. 3,904,737.

FIELD OF THE INVENTION

The present invention relates to a method for producing elemental metals or metal alloys and metal compositions of high purity. More particularly, the invention relates to a chemical procedure for obtaining refractory metals, from compounds containing same, with controlled composition at a relatively low cost.

BACKGROUND OF THE INVENTION

Generally speaking metals may be obtained from their ores by processes starting with compounds such as oxides or halides of the desired metal, which are reduced chemically or electrolytically. Very electropositive metals whose compounds are therefore difficult to reduce are often treated chemically by low-cost products such as hydrogen, carbon, or carbon monoxide at a very high temperature which causes the formation of stable carbides which make it impossible to prepare sufficiently pure metals. It is therefore necessary to use chemical reducing agents which are much more expensive such as alkali metals or alkaline earths, magnesium or silicon, or to employ electrolytic reduction which uses large quantities of electricity.

The alloys of these metals are usually obtained by simultaneous fusion of the elements of the alloy when their melting points are substantially equal. When this is not the case, the less easily melted metals are dissolved in the other previously molten metals. This latter operation is usually unduly long with certain refractory metals and requires an atmosphere which is preferably inert at the elevated temperatures required to obtain sufficiently rapid dissolution. It is also very difficult to react at high temperature a relatively volatile metal with a refractory metal and problems with contamination from the containing vessel arise.

The processes as well as the suspension furnaces which are used to prevent the alloy from reacting with the receptacle are very difficult to use and extremely expensive. In addition they are only nominally useful for large-scale industrial production of alloys. Finally this preparation of alloys by direct action of the elements requires that the individual elements themselves be prepared as powders, for the refractory metals in a high degree of purity and, in certain cases, be absolutely pure, which is once again difficult to achieve and expensive.

OBJECTS OF THE INVENTION

It is therefore an object of the present invention to provide an improved method of making a metal or an alloy of high purity.

More particularly it is an object of this invention to chemically produce metals of the groups IIIA, IVA, VIA and IIIB of the Periodic Chart (shown on pages 448 and 449 of the Forty-First edition of the *Handbook of Chemistry and Physics* published in 1960 by the Chemical Rubber Publishing Company).

It is also an object of the present invention to provide a method of making yttrium, the lanthanides (elements of atomic numbers 58 to 71 inclusive), titanium, zirconium, hafnium, chromium, gallium, indium or thorium and alloys thereof in high purity.

Another object of the invention is a chemical method of producing alloys which can be used for two or more of the above-named metals as well as binary or higher order alloys of these metals with any other metal.

DESCRIPTION OF THE INVENTION

The process according to the present invention is based in principle on the reduction by hydrogen of the metal cyanide complex of the metal or the metals in question. If the cyanide complex is monometallic (i.e. containing only a single metallic element) its reduction by hydrogen yields one metal. If on the contrary the cyanide complex is polymetallic (i.e. containing several different metallic elements) its reduction yields an alloy.

Such mono- and polymetallic cyanides have been described along with their methods of preparation in copending U.S. patent application, Ser. No. 250,079 commonly filed with this application and entitled NEW METAL CYANIDE COMPLEXES AND METHOD OF MAKING SAME.

In the case of monometallic cyanides which can be obtained preferably according to the above-named patent applications by reacting hydrocyanic acid HCN with a metal hydrate according to the general reaction formula:

(I) metallic hydrate(hydroxide or oxide) + hydrocyanic acid → cyanide complex + water The named metals are produced by reducing the cyanide complex with hydrogen according to the general reaction formula:

(II) cyanide complex + hydrogen → metal + hydrocyanic acid.

The hydrocyanic acid thus obtained, with minor losses, in reaction (II) is used again for reaction (I), making a cycle which indirectly reduces the metal hydrate (hydroxide) by hydrogen, which often is impossible to do directly. In the production of alloys, polymetallic cyanide complexes are reduced by hydrogen according to the general reaction formula:

(III) polymetallic cyanide + hydrogen → alloy + hydrocyanic acid.

In this case again the hydrocyanic acid which is recovered in reaction (III) can be used to obtain polymetallic cyanides.

The surprising discovery is that the reduction by hydrogen of a polymetallic cyanide complex according to reaction (III) yields an alloy in the form of a fine powder each granule of which is an alloy particle and not just a juxtaposition of granules of each of the component metals. Thus the process according to the present invention yields an alloy formed by a homogeneous phase (solid metallic solution or definite combination) or a mixture of phases conforming to that predicted by the formula. In other words the uniform alloy obtained according to the present invention has the same structure as that which is obtained by fusion and cooling of the metals, with the condition, of course, that the proper thermal treatments have been carried out so that the phases appear under identical allotropic forms.

The powders so produced can be used in powder metallurgy. The production of sintered-metal bearings and like parts is facilitated by the high-purity powders according to the present invention.

The advantages which the present method has over the prior-art processes are numerous: First of all the temperatures necessary are relatively low. They range between 700° and 1300° C. according to the metal, which is substantially lower than the temperatures necessary for the prior-art methods. It is also much easier to avoid reaction with the receptacles at these temperatures, and purer products are obtained.

In the case of refractory metals and alloys the cyanide reduction process according to the present invention yields a powder whose granule size is dependent on the final temperature and also on how long this temperature is maintained. This means that metallic materials can be produced which are particularly adapted to sintering.

The economical advantages inherent in the present invention are a result of using hydrogen as reducing agent, hydrogen being particularly inexpensive and of avoiding preparation of the constituent elements of the alloy individually, this operation being often very difficult and expensive when the metals are refractory or very reactive, as the metals of the lanthanum series.

The conditions under which the operations of the present invention are carried out depend on the metal or the alloy to be made. This process includes, however, some basic steps:

1. Formation of the Metal Cyanide Complex

The crystals of the cyanide metal complex which are to be reduced with hydrogen in order to obtain a metal or a metallic alloy are prepared according to the methods described in the above-mentioned commonly filed patent application.

According to the principles set forth in our copending application Ser. No. 250,079 and identified more fully above, the metal complex may be formed by two main process sequences, whether the complex is of the monometallic type or of the polymetallic type.

Thus the complex may be produced by treating a basic compound of a metal M or of several metals (M, M′, M″ . . . ) as a simple compound, a mixed-metal compound, a coprecipitate of metal compounds, a mixture of precipitates of the metal compounds or a compound containing two or more of the metals, and preferably in the form of the oxide, hydroxide, carbonate or salts which can be considered weakly basic, with a complex acid having the general formula $H_y[M(CN)_x]_p$ where M represents the same metal as that of the basic compound in the case of a monometallic complex or a different metal in the case of a polymetallic complex, $x$ represents the coordination number of the Metal M, and $y$ and $p$ are determined by the ionic valances of the portion of the molecule in square brackets. This neutralization reaction produces either the polymetallic complex or the monometallic complex of which examples have been given below.

The complex acid may be formed, on the one hand by ion-exchange principles and, on the other hand, by ionic displacement methods. In accordance with the ion-exchange technique, an acid ion-exchange resin may be prepared and a solution of an alkali-metal (e.g. potassium) salt of the complex anion may be passed therethrough so that hydrogen ion exchanges for potassium ion and the acid appears in the eluate. Of course, anion-exchange resins may be used whereby the resin is charged with the complex anion and is eluted with an acid whose anion exchanges for the complex anion so that again the complex acid appears in the eluate.

In the second technique, a displacement method is used whereby, for example, a barium salt of the complex anion is reacted in aqueous solution with sulfuric acid to precipitate barium sulfate and leave complex acid in solution. The barium salt of the complex may be produced, in turn, by reacting the metal sulfate with barium cyanide to precipitate barium sulfate and leave the barium cyanide complex in solution.

When the complex acid is reacted with the basic compound by forming the complex acid in situ, i.e. by reacting HCN with the hydroxide, oxide, carbonate etc. of the metal to be found in a monometallic complex, the hydrocyanic acid is used in a concentration of 10 to 60% by weight and in excess over the basic compound by 10 to 20%. The use of the previously prepared complex acid requires a predetermined quantity according to the stoichiometry. It is important to observe that the solution containing the metal-metal cyanide complex should have the metals in their desired proportions in the alloy to be produced and, therefore, in the desired proportions in the crystalline product.

The crystal are formed preferably by low temperature removal of the water from the solution and we may use vacuum evaporation at temperatures up to, say, 60° C. or removing the water by azeotropic distillation under reduced temperatures up to 40° C. A suitable azeotropic entrainer for this purpose is gasoline.

2. Reduction of the Metal Cyanide Complex

The crystals of the metal cyanide complex are first dried in a pure and dry hydrogen atmosphere or under a vacuum at 200° C. Then they are reduced by dry and pure hydrogen passed over or through them at a rate between 2 liters per hour to 10 liters per hour (1/H) at temperatures between 700° C. and 1300° C. The metal or the alloy yielded by this reduction of the complex is recovered depending on its fusion temperature and the temperature of the end of the reduction as a liquid or as a powder.

In the case of a metal such as zirconium it is necessary to bring the temperature at the end of the reduction to at least 1200° C. to eliminate the intermediate hydride which has formed. In the case of thorium whose hydride is even more stable, it is absolutely necessary to follow up the reduction treatment with a heating under vacuum ($10^{-4}$ bar) at 1100° C. in order to decompose the hydride and yield the metal. The drying temperature may be in the range of 150° to 250° C.

In this reduction operation the hydrogen in excess to that needed for the reduction of the solid carries off the hydrocyanic acid formed. This latter product is extracted by scrubbing with water, thereby obtaining a solution which can be used again for the preparation of the starting cyanide complexes. The hydrogen after drying is recycled to the apparatus for reducing the complex after the quantity of hydrogen lost in the reduction reaction is added back to it.

EXAMPLE I

Chromium Powder

The hexacyanochromate of chromium (III): $Cr[Cr(CN)_6]$ is prepared according to the method of Example III of the above-described copending patent application.

The crystals of this cyanide complex are first dried for several hours in a stream of dry and pure hydrogen at 200° C. Thereafter, still with this same hydrogen stream, the temperature is raised at 600° C./h to 700° C. This yields a powder of metallic chromium.

EXAMPLE II

Titanium

The octacyanotitanate of titanium (IV): $Ti[Ti(CN)_8]$ is first prepared according to Example V of the above-named copending application. The crystals of this cyanide complex are first dried in a stream of pure and dry hydrogen at 200° C. for several hours, then, still with this same hydrogen stream, the temperature is raised 600° C./h to 1000° C. and this latter temperature is maintained for 4 to 5 hours. This yields a hydrided titanium powder which can be subjected to a vacuum of $10^{-4}$ bar at 1000° C. to yield the pure metal.

EXAMPLE III

Metallic zirconium

The octacyanozirconate of zirconium (IV): $Zr[Zr(CN)_8]$ is first prepared according to the method of Example VI of the above-named copending patent application. The crystals of this cyanide complex are first dried as described in Example V of this application and then the temperature is raised, still with this same hydrogen stream, at 600° C./h to 1200° C. This latter temperature is held for 4 to 5 hours. The intermediate hydride so produced loses its hydrogen and becomes a fine powder of metallic zirconium.

EXAMPLE IV

Thorium

The octacyanothorate of thorium: $Th[Th(CN)_8]$ is first prepared according to Example VII of the previously cited application. The crystals of this cyanide complex are dried and their temperature is raised as in Example VI of this application to 1200° C. This produces a thorium hydride which when subjected to a vacuum of $10^{-4}$ bar at 1100° C. yields the metal.

EXAMPLE V

Production of an Alloy of Cobalt and Samarium $SmCo_5$ Whose Magnetic Properties are Well Known for Use in Permanent Magnets The method described immediately below is equally applicable to other alloys of cobalt with any other lanthanide in any other proportion.

The bimetallic cyanide complex having the formula $H_{12}Sm[Co^{III}(CN)_6]_5$ is prepared according to the method of Example X of the above-cited application.

The crystals of this cyanide complex are dried with hydrogen and their temperature is raised as in Example VI to 1250° C. The reduction of the complex starts at around 750° C. and stops at between 1000° C. and 1100° C., but the powder of alloy $SmCo_5$ is then too oxidizable so that the temperature is raised to between 1250° C. and 1300° C. under hydrogen in order to agglomerate the granules of the powder by slight sintering to obtain a less oxidizable alloy.

EXAMPLE VI

Production of Nickel-neodymium $NdNi_5$

This method is equallyusable to produce alloys of nickel with any other lanthanide or with yttrium in other proportions.

The bimetallic cyanide complex having formula $H_7Nd[Ni(CN)_4]$ is prepared according to the method described in Example XI of the above-cited commonly assigned patent application.

The crystals of this cyanide complex are reduced exactly as in Example IX of this application to produce an alloy powder $NdNi_5$.

EXAMPLE VII

Chromium-yttrium YCr

This method is equally applicable for alloys of chromium with the other lanthanides or yttrium in other proportions.

The bimetallic cyanide complex $Y[Cr(CN)_6]$ is produced according to the method of Example XII of the above-cited copending application.

The crystals of this complex are treated exactly as described in Example IX above to yield a powder YCr.

EXAMPLE VIII

Lanthanum-yttrium LaY

This method is equally applicable for any alloy containing two or more lanthanide elements or lanthanide elements alloyed with yttrium in the corresponding proportions.

The bimetallic cyanide complex of formula $La[Y(CN)_6]$ is prepared according to the method of Example XIII of the above-cited copending patent application.

The crystals of this cyanide complex are then reduced by hydrogen under the same conditions as given in Example VIII of this application to yield a powder of lanthanum-yttrium alloy LaY.

EXAMPLE IX

Production of Cobalt-samarium-barium $SmBa_{0.1}Co_5$

The trimetallic dyanide complex having formula $SmBa_{0.1}H_{11.8}[Co(CN)_6]_5$ is prepared according to the method described in Example XV of the above-cited commonly assigned patent application.

The crystals of this cyanide complex are then reduced with hydrogen under the same conditions as those of Example IX of this application and thereby yield a powder of the ternary alloy having a composition corresponding to the formula $SmBl_{0.1}Co_5$.

EXAMPLE X

Production of Cobalt-samarium-neodynium-proseodymium Alloy $Sm_{0.5}Nd_{0.25}Pr_{0.25}Co_5$ The polymetallic cyanide complex having the formula $Sm_{0.5}Nd_{0.25}Pr_{0.25}H_{12}[Co(CN)_6]_5$ is prepared according to the method described in Example XVI of the above-cited application.

The method of Example IX above is employed to yield an alloy powder having a composition of the formula $Sm_{0.5}Nd_{0.25}Pr_{0.25}Co_5$.

It is possible and within the scope of the present invention to use the same or similar process for any alloy of cobalt containing other lanthanides of yttrium in the various proportions corresponding to the alloy composition.

We claim:

1. A process for producing a metal or a metal alloy consisting essentially of the steps of forming a cyanide complex selected from the group which consists of:

$Ti[Ti(CN)_8]$;
$Zr[Zr(CN)_8]$;
$Th[Th(CN)_8]$;
$Y[Y(CN)_6]$;
$Cr[Cr(CN)_6]$;
$H_2Sm[Co(III)(CN)_6]_5$;
$H_7Nd[Ni(CN)_4]_5$
$Y[Cr(CN)_6]$;
$La[Y(CN)_6]$;
$SmBa_{0.1}H_{11.8}[Co(CN)_6]_5$; and
$Sm_{0.5}Nd_{0.25}Pr_{0.25}H_{12}[Co(CN)_6]_5$;

the complex by crystallizing it from an aqueous solution of ions of its components, and drying the crystals thus formed under vacuum or in a stream of hydrogen at a temperature of 150° to 250° C.; and reducing said cyanide complex with dry gaseous hydrogen at a temperature 700° to 1300° C.

2. The process defined in claim 1 wherein said complex is monometallic.

3. The process defined in claim 1 wherein said complex is polymetallic.

4. The process defined in claim 1 wherein said cyanide complex is formed by treating with an aqueous solution of hydrocyanic acid, a hydrate of the metal.

5. The process defined in claim 1 wherein the temperature of said crystals is raised from the drying temperature to the reducing temperature at a rate of about 600° C. per hour.

6. The process defined in claim 5 wherein the dry crystals are exposed to a stream of hydrogen for a period of at least 2 hours.

7. The process defined in claim 6 wherein reduction of the crystals is carried out at a temperature below the melting point of the metal recovered.

8. The process defined in claim 1 wherein said crystals are produced by:
A. reacting an aqueous solution containing 10 to 60% by weight of hydrogen cyanide with a basic compound of at least one metal and selected from the group which consists of the hydroxides, oxides and carbonates of the metal alone or in association with the corresponding compounds of another metal;
B. recovering an aqueous solution containing a metal-metal cyanide complex from step (A); and
C. recovering crystals of said metal-metal cyanide complex from the solution in step (B) by heating said solution at a temperature below 60° C. under vacuum to evaporate water.

9. The process defined in claim 1 wherein said crystals are produced by:
A. preparing an acid metal-cyanide complex in aqueous solution and reacting said acid with a metal hydroxide, oxide or carbonate;
B. recovering an aqueous solution containing a metal-metal cyanide complex from step (A); and
C. recovering crystals of said metal-metal cyanide complex from the solution in step (B) by heating said solution at a temperature below 60° C. under vacuum to evaporate water.

10. The process defined in claim 1 wherein said crystals are produced by:
A. reacting an aqueous solution containing 10 to 60% by weight of hydrogen cyanide with a basic compound of at least one metal and selected from the group which consists of the hydroxides, oxides and carbonates of the metal alone or in association with the corresponding compounds of another metal;
B. recovering an aqueous solution containing a metal-metal cyanide complex from step (A); and
C. recovering crystals of said metal-metal cyanide complex from the solution in step (B) by azeotropically distilling water from said solution at a temperature of at most 40° C. and at reduced pressure with an azeotropic entrainer.

* * * * *